(12) United States Patent
Hrubes

(10) Patent No.: US 8,941,389 B2
(45) Date of Patent: Jan. 27, 2015

(54) POSITION SENSOR

(75) Inventor: Franz Hrubes, Rotthalmünster (DE)

(73) Assignee: Micro-Epsilon Messtechnik GmbH & Co. KG, Ortenburg (DE)

(*) Notice: Subject to any disclaimer, the term of this patent is extended or adjusted under 35 U.S.C. 154(b) by 341 days.

(21) Appl. No.: 13/131,816

(22) PCT Filed: Feb. 1, 2010

(86) PCT No.: PCT/DE2010/000096
§ 371 (c)(1),
(2), (4) Date: Aug. 8, 2011

(87) PCT Pub. No.: WO2010/099770
PCT Pub. Date: Sep. 10, 2010

(65) Prior Publication Data
US 2011/0304345 A1    Dec. 15, 2011

(30) Foreign Application Priority Data

Mar. 2, 2009 (DE) .................. 10 2009 011 060
May 28, 2009 (DE) .................. 10 2009 022 992

(51) Int. Cl.
G01R 27/28 (2006.01)
G01D 21/00 (2006.01)
G01D 1/00 (2006.01)
G01D 15/00 (2006.01)

(52) U.S. Cl.
CPC .................. *G01D 21/00* (2013.01); *G01D 1/00* (2013.01); *G01D 15/00* (2013.01)
USPC .......................................... 324/654; 324/546

(58) Field of Classification Search
USPC ........ 324/546, 547, 629, 207.15, 207.17, 654
See application file for complete search history.

(56) References Cited

U.S. PATENT DOCUMENTS

| | | | |
|---|---|---|---|
| 3,045,227 A | 7/1962 | Minas | |
| 3,142,810 A | 7/1964 | Smith | |
| 4,628,499 A * | 12/1986 | Hammett | ........................ 700/56 |
| 4,816,759 A | 3/1989 | Ames et al. | |
| 5,221,896 A | 6/1993 | Kobayashi et al. | |
| 5,901,458 A | 5/1999 | Andermo et al. | |
| 6,201,387 B1 * | 3/2001 | Govari | ..................... 324/207.17 |
| 6,259,249 B1 | 7/2001 | Miyata | |

(Continued)

FOREIGN PATENT DOCUMENTS

DE    692 19 498 T2    12/1997
DE    198 55 685 A1    6/1999
(Continued)

OTHER PUBLICATIONS

International Search Report for International Application No. PCT/DE2010/000096, Sep. 10, 2010.
(Continued)

*Primary Examiner* — Vincent Q Nguyen
(74) *Attorney, Agent, or Firm* — Alston & Bird LLP

(57) ABSTRACT

A position sensor that includes two coils, the first coil (transmitting coil) being fed a certain frequency such that it emits a constant electromagnetic field, and said field being received and/or detected by way of the second coil (receiving coil), is characterized in that the axis of the second coil is angled with respect to the axis of the first coil, preferably located at an angle of 90° with respect to the axis of the first coil.

10 Claims, 8 Drawing Sheets

(56) References Cited

U.S. PATENT DOCUMENTS

| | | | |
|---|---|---|---|
| 2001/0020846 A1* | 9/2001 | Miyata | 324/207.17 |
| 2006/0097733 A1 | 5/2006 | Roziere | |
| 2007/0076332 A1* | 4/2007 | Shoji et al. | 360/324.12 |
| 2009/0140729 A1 | 6/2009 | Roziere | |

FOREIGN PATENT DOCUMENTS

| | | |
|---|---|---|
| FR | 2 907 211 | 4/2008 |
| JP | H10-148502 A | 6/1998 |
| JP | H11-230706 A | 8/1999 |
| JP | 2005-175216 A | 6/2005 |
| JP | 2006-017680 A | 1/2006 |

OTHER PUBLICATIONS

Written Opinion for International Application No. PCT/DE2010/000096 (English translation), Feb. 1, 2010.

Office Action for Japanese Application No. 2011-552318 dated Nov. 12, 2013.

Office Action for Chinese Application No. 201080004324.2 dated Mar. 22, 2013.

Office Action for Chinese Application No. 201080004324.2 dated Jan. 3, 2014.

* cited by examiner

POSITION SENSOR

BACKGROUND OF THE INVENTION

1. Field of the Invention

The invention concerns a distance sensor that operates contactless, which makes the relative displacement and/or relative position of two opposite objects measureable through field intensity measurement of an electromagnetic field emitted by transmitting coils and detected by means of receiving coils. Specifically the invention concerns a position sensor with two coils, the first coil (transmission coil) being fed with a certain frequency so that it emits a constant electromagnetic field and this field being received or detected by means of a second coil (receiving coil).

2. Description of Related Art

Sensors to measure the displacement of two objects relative to each other are generally known. There are different measurement principles, each of which has certain advantages and also disadvantages. The best solution must be chosen, depending on the requirement for accuracy, resolution, temperature dependence, measurement speed, long-term stability, admissible power loss, etc. and the prevailing environmental conditions. Extremely high demands in this respect are involved in position and displacement measurement in precision optics. This involves accuracies in the nanometer and subnanometer range. Two areas of application are of particular significance:

Micropositioning in the production of semiconductors and adjustment of segmented mirrors relative to each other in reflecting telescopes for stellar observation. Several different principles have thus far been used.

Very precise measurements can be accomplished with optical sensors. Capacitive sensors are also very precise. An example of this is described in FR 2 844 048-A1. A major disadvantage in both principles is the dependence of the measurement on effects of moisture and dirt. They are also not suitable in principle for use in reflecting telescopes. Path sensors that operate according to the eddy current loss principle are insensitive to water and dirt, but the temperature dependence of the measurement can only be compensated as precisely as necessary with very high expense.

French unexamined application FR 2 907 211 A1 solves the task of an arrangement of a coil array with a conducting measured object, which is mounted on the opposite mirror segment. The change of inductance is then evaluated, which the measured object produces as a function of its position relative to the individual coils of the array. Measurement can be conducted in three axes with this arrangement. A drawback of the arrangement is the relatively large design and therefore large dependence on mechanical deformations, which can develop, for example, by temperature changes. The temperature-dependent conductivities of the coils and the measurement object also play a non-negligible role.

A transformer principle based on a primary and secondary coil (transmitting and receiving coil) therefore remains as the only possibility.

U.S. Pat. No. 4,816,759 describes for this purpose an arrangement with an oscillator that supplies two transmitting coils connected in series and two receiving coils each of which is completed to an oscillator circuit with a parallel capacitor. One of the two transmitting coils is mounted on the face of a mirror element. The corresponding receiving coil is positioned on the face of the opposite mirror segment. The second transmitting-receiving pair is positioned with reverse transmission-receiving direction, offset at the same height along the faces. The displacement between the transmitting side and the receiving side is evaluated by phase measurement. A zero passage of the phase position of the measured signal is obtained here with plane-parallel agreement of the mirror segments. This principle is essentially suitable for aligning the parallelism of the segments, but provides no additional information concerning other angle and distance dependences of the segments relative to each other.

WO 2007/006910 describes a transformer principle with two primary coils (transmitting coils) connected in series and two opposite secondary coils (receiving coils). The coils are laid out as flat coils, the transmitting and receiving coils each being arranged next to each other and parallel to each other. The transmitting coils are fed in counter-phase with an AC signal. A precise null point recording is obtained with this principle by difference measurement of the two receiver voltages. At the same time, the distance between the two mirror elements can be measured by summing the two receiver voltages. The distance dependence of the measurement of parallelism of the mirror segments relative to each other can be eliminated by forming the ratio of the difference voltage and the sum voltage. What cannot be eliminated, however, is an angle dependence.

A further drawback is the required large surface for the coils, since mechanical deformations, for example, by thermal expansion, play a non-negligible role.

The underlying task of the present invention is to avoid the drawbacks previously encountered in the prior art as much as possible.

SUMMARY OF VARIOUS EMBODIMENTS

The invention involves a position sensor with two coils, the first coil (transmitting coil) being fed with a certain frequency so that it emits a constant electromagnetic field and this field being received or detected by means of a second coil (receiving coil). This involves a position sensor with two coils, the first coil (transmitting coil) being fed with a certain frequency so that it emits a constant electromagnetic field and this field being received or detected by means of a second coil (receiving coil).

The underlying principle of the invention is:

Two coils form a transformer, i.e., one coil acts as primary coil (transmitting coil), the second coil as secondary coil (receiving coil). Coupling between the coils changes when the relative position of the two coils to each other changes. The two coils are arranged so that they are at right angles to each other, the axis of the transmitting coil being arranged parallel to the plane of the transmitting coil.

According to the depiction in FIG. 2, the transmitting coil 1 is supplied with a high frequency AC voltage of constant amplitude. A voltage of the same frequency is induced in the receiving coil 3 by the electromagnetic alternating field. The level of the voltage depends on coupling of the coils, which in the present case depends on the position of the coils relative to each other.

In a special arrangement (FIG. 6) the position of a measured object is to be determined with several coils. Two transmitting coils 1*a* and 1*b* are supplied with an alternating voltage of the same or different frequency and the same or different but constant amplitude. With equal feed the coils can be connected parallel or in series. A voltage is induced in the receiving coil 3, which is opposite the transmitting coil 1*b*. A voltage is also induced in the receiving coils 5 and 6. These coils 2 and 3 are aligned parallel to each other and arranged opposite the transmitting coil 1*a*. Measurement can be conducted with coil 3 in the z direction, with coils 2 and 3 in the x and y direction: a displacement of coils 2 and 3 parallel to coil 1a in the x direction is proportional to the difference of the signals from E5 and E6 (E5−E6). A change in the distance of coils 5 and 6 relative to coil 1a in the y direction, on the other hand, is proportional to the sum of the signals from E5 and E6 (E5+E6).

The transmitting coils 1a and 1b are driven with known oscillator circuits. It is useful to supplement the coils with a parallel capacitor and drive them in resonance, since the sensitivity is then particularly high and the current demand low.

The measurement arrangement according to the invention is characterized in particular by extremely high sensitivity (in terms of measurement) so that very high resolutions are achieved. Resolutions in the subnanometer range can be achieved in a typical arrangement in measurement ranges that lie at 500 µm. The required coil dimensions are relatively small.

To reduce EMC emission the coils 1a and 1b can be operated in counter-phase. The electromagnetic fields are eliminated in the far field so that an interfering effect in the far field is reduced. In order to reduce sensitivity to interference of the receiving coil 3, the ratio of the signal from E3 and the sum signal from E5 and E6 is used for measurement: E3/(E5+E6). Interfering influences that act identically on 3 and 5 and 6 are therefore largely eliminated (for example, EMC disturbances or especially temperature effects). A requirement is that the coils 3 and 5 and 6 are arranged sufficiently close to each other in order to achieve an identical effect. In the same manner a compensation of interfering effects is achieved for the measurement of displacement in the x direction by ratio formation by forming the ratio between the difference and sum of 5 and 6 ((E5−E6)/(E5+E6)).

The invention can best be explained by means of a specific practical example:

An appropriate measurement range that can be used to detect positions in three directions, namely either a distance change of sensor plate B relative to sensor unit A (y direction) or a displacement of B relative to A (x direction) or a displacement in the z direction. Three independent signals for directions x, y and z can be generated by the arrangement of coils relative to each other. It is useful to arrange the coils close to each other in order to obtain a compact design and also to achieve the same effect necessary for compensation. The coils, for example, could be designed as flat coils on an ordinary circuit board. Manufacture would be particularly simple and cost effective on this account but not particularly temperature-stable and without long-term stability. The electronics for driving and evaluating the coils could also be arranged on the circuit boards so that the arrangement would also be compact and favorable. Another practical example is characterized by the fact that the coils are produced by known methods as flat coils on a ceramic substrate.

It is particularly favorable if the coils are produced on a ceramic multilayer substrate in which the coils lie in the interior of the sandwich structure. The coils are then completely shielded from the surroundings by hermetic encapsulation, which arises in the production process of a ceramic multilayer. An especially long-term- and temperature-stable design of the coils is obtained on this account. The produced coils are therefore characterized by excellent environmental stability (hermetically encapsulated) and long-term stability. This is precisely an advantage if the high resolution of the measurement arrangement is to be exploited. It is particularly favorable, if the coils are designed not as circular coils, but as coils with a rectangular surface. The resulting electromagnetic field within the coil surface is then almost constant. During evaluation of the measurement in the y direction the resulting measured value is then only dependent on the decline in field intensity in the y direction (roughly inversely proportional to distance) and not on the coil shape, which has a favorable effect on the evaluation.

The described measurement arrangement can be used anywhere very precise distances or positions are to be measured. The arrangement described second is particularly suitable for measurements in all three spatial coordinates, where particularly high resolutions and stability requirements prevail.

Examples of this are:

Micropositioning in semiconductor production (wafer stage): In this case during semiconductor production the wafer must be aligned very precisely relative to the exposure axes. With the increasingly smaller structure widths that are used in present semiconductor processes, precise positioning is necessary for quality. Future exposure systems that operate with EUV radiation require positioning accuracies in the picometer range. This is possible with the present measurement arrangement.

Positioning of segmented mirrors in reflecting telescopes: Modern reflecting telescopes no longer consist of one large mirror, but of numerous individual mirrors arranged in a honeycomb. The individual mirrors must be precisely aligned with each other so that the light is precisely focused at the focal point during stellar observation. Because of the great distances that are observed with these telescopes the positioning accuracies of the individual mirrors are a few nanometers. The mirrors must then be precisely aligned in all three spatial directions in order to achieve focusing at the focal point.

BRIEF DESCRIPTION OF THE SEVERAL VIEWS OF THE DRAWINGS

There are now different possibilities of configuring and modifying the instructions of the present invention advantageously. Various embodiments of the present invention, on the one hand, and the following explanation of preferred practical examples of the invention with reference to the drawing, on the other, are referred to for this purpose. In conjunction with explanation of preferred practical examples of the invention with reference to the drawing, preferred embodiments and modifications of the instructions are also explained in general. In the drawing FIG. 1 schematically depicts an arrangement known from the prior art, FIG. 2 schematically depicts a practical example of the invention, FIG. 3 schematically depicts a practical example of the invention, FIG. 4 schematically depicts a practical example of the invention as a combination of the arrangements from FIGS. 1 and 2, FIG. 5 schematically depicts a practical example of the invention, FIG. 6 schematically depicts a practical example of the invention expanded to three measurement axes, FIG. 7 schematically depicts a practical example of the invention, FIG. 8 schematically depicts a practical example of the invention.

DETAILED DESCRIPTION

Figure 1:
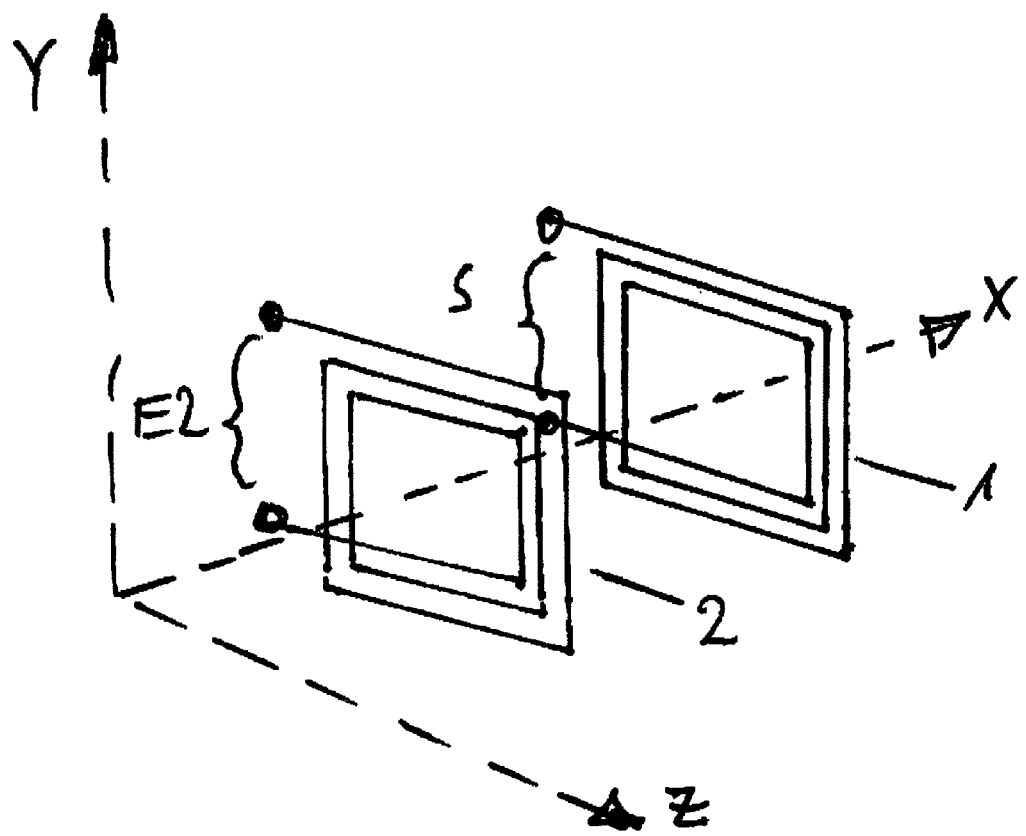

According to the depiction in FIG. 1, a preferably rectangular coil (1) is fed (S) with a specific frequency of constant amplitude so that it emits a constant electromagnetic field.

This is received by means of a second coil (2) whose axis is arranged identical to the axis of the transmitting coil. The receiver voltage (E2) is directly dependent on the distance between the transmitting coil and the receiving coil, i.e., in the y direction.

This voltage is nonlinearly dependent on distance and continuously diminishes with increasing distance. In order to be able to counter-phase. measure the distance between coils the characteristic must be linearized by calculation or circuitry.

Figure 2:
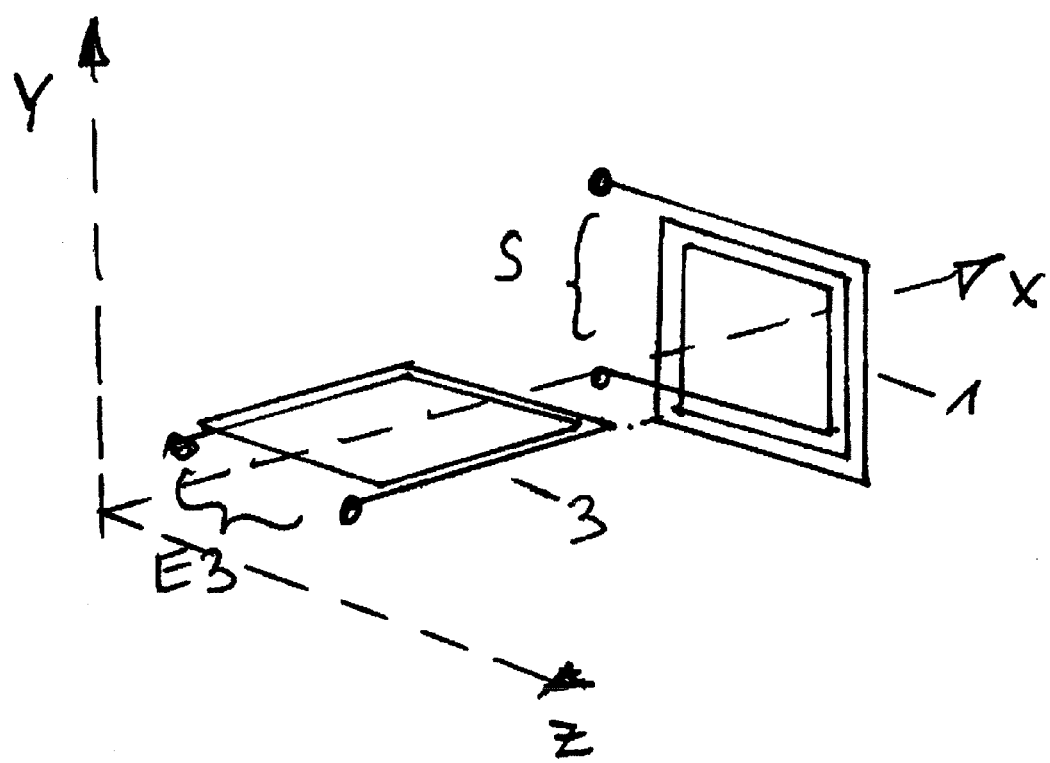

FIG. 2 shows a practical example of an arrangement according to the invention. A perfectly rectangular coil (1) is fed (S) with a certain frequency of constant amplitude so that it emits a constant electromagnetic field. This is received by means of second coil (3) whose axis lies 90° in the vertical direction (z) relative to the axis of the transmitting coil.

If the coil (3) lies in the center relative to coil (1), no induction voltage (E3) develops on the coil ends, since none of the occurring magnetic field lines intersect the coil (3). With a nonsymmetrically acting field a voltage occurs on the coil ends, which varies over a certain range on both sides of the center position linearly with the parallel positioning displacement (direction z) and in so doing rotates the phase position relative to the transmitting signal by 180° on passage through the center position. In this way a simple sensor can be implemented with which the parallel displacement of the two coils relative to each other can be measured, the attainable measurement path being somewhat smaller than the coil diameter of the transmitting coil. The induced receiver voltage, as already explained, is linear in the center area and becomes increasingly more nonlinear toward the end of the area. The slope of the characteristic over the measurement path is then dependent on the base distance of the coils.

Figure 3:
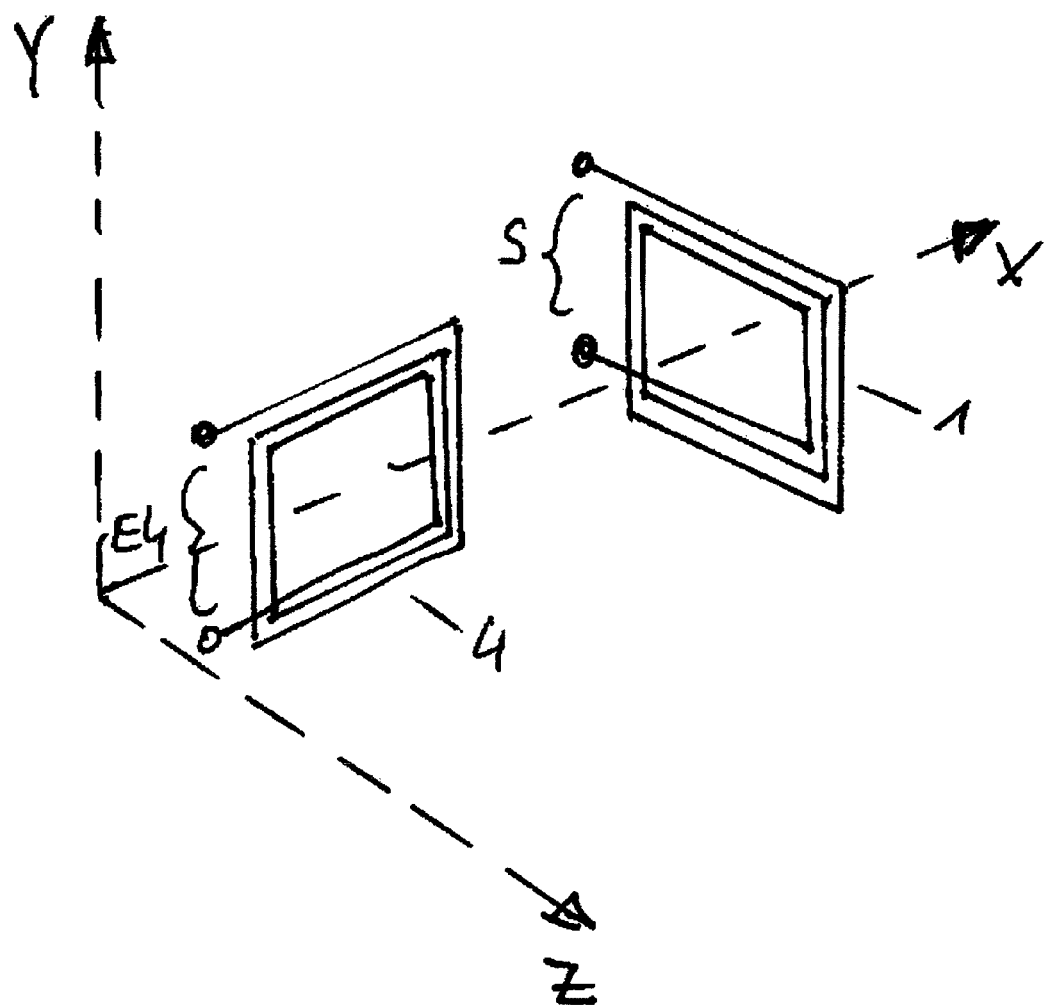

According to the depiction in FIG. 3, a preferably rectangular coil (1) is supplied (S) with a specific frequency of constant amplitude so that it emits a constant electromagnetic field. This is received by means of a second coil (4), whose axis lies 90° in the horizontal direction (x) relative to the axis of the transmitting coil.

If the coil (4) lies in the center relative to the coil (1), similar to FIG. 2, no induction voltage (E4) forms on the coil ends. With a nonsymmetrically acting field a voltage occurs on the coil ends, which varies linearly with the parallel position displacement (direction x) over a certain range on both sides of the center position and in so doing rotates the phase position relative to the transmission signal by 180° on passing through the center position. In this way a simple sensor can be implemented with which the parallel displacement of the two coils relative to each other can be measured, the obtainable measurement path being somewhat smaller than the coil diameter of the transmitting coil. The induced receiver voltage, as already mentioned, is linear in the center area and becomes increasingly nonlinear toward the end of the area. The slope of the characteristic over the measurement path then depends on the base distance of the coils.

Figure 4:
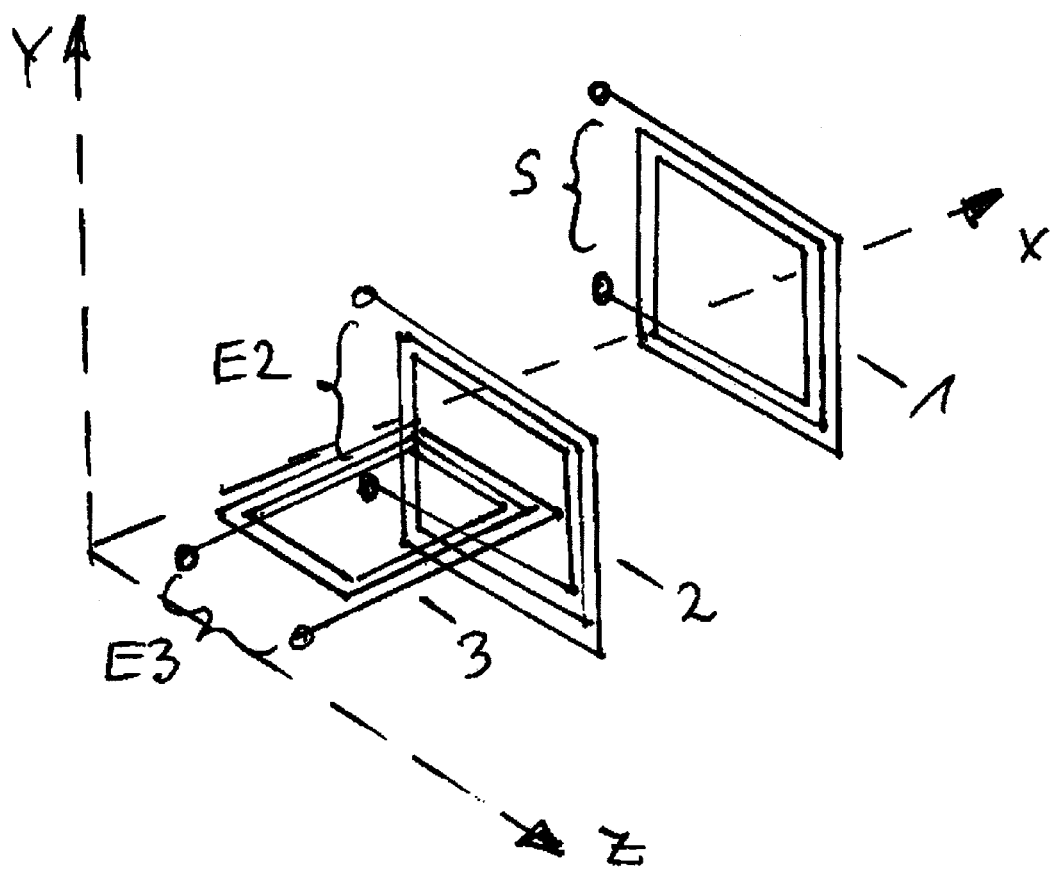

FIG. 4 shows a combination of arrangements from FIGS. 1 and 2. The two coils (2) and (3) are nested one in the other. The coil plane of coil (3) lies on the axis of coil (2). To achieve independence of the slope of the characteristic of the receiver voltage (E3) on the distance to coil (1) the field intensity must be measured by means of a second coil (2) (receiver voltage E2). By forming the ratio (E3/E2) of the two receiver voltages the distance independence of the position measurement in the z direction is implemented over a certain displacement range. It must then be kept in mind that the sign is reversed on zero passage because of the phase rotation that arises from the prevailing field direction.

Figure 5:
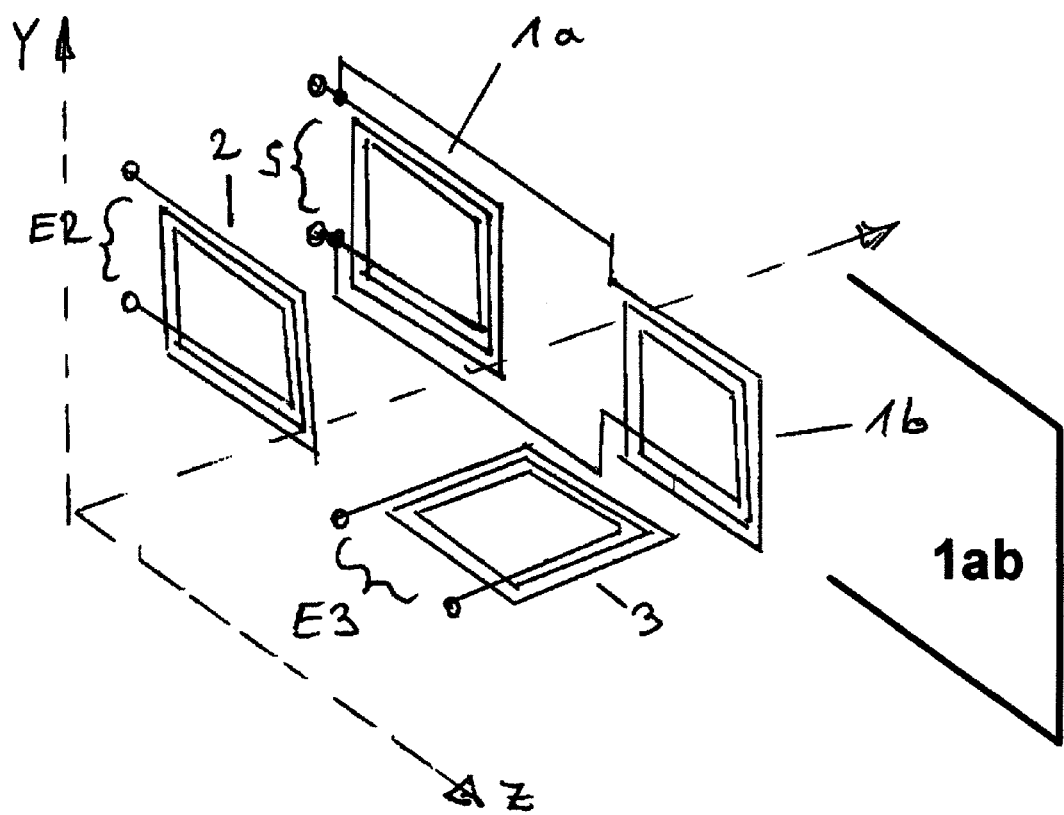

FIG. 5 shows another possibility of the arrangement, namely the use of two transmitting coils (1a) and (1b), these being arranged next to each other on the same plane (1ab). The two receiving coils (2) and (3) also lie at the same distance next to each other and are mechanically rigidly connected. The transmitting coils are supplied simultaneously with constant AC voltage (S). As in FIG. 4, it also applies here that a distance independence of the position measurement in the z direction is achieved by ratio formation (E3/E2).

Similarly, the combination of coils (4) and (2) is also possible and considered inventive.

Figure 6:
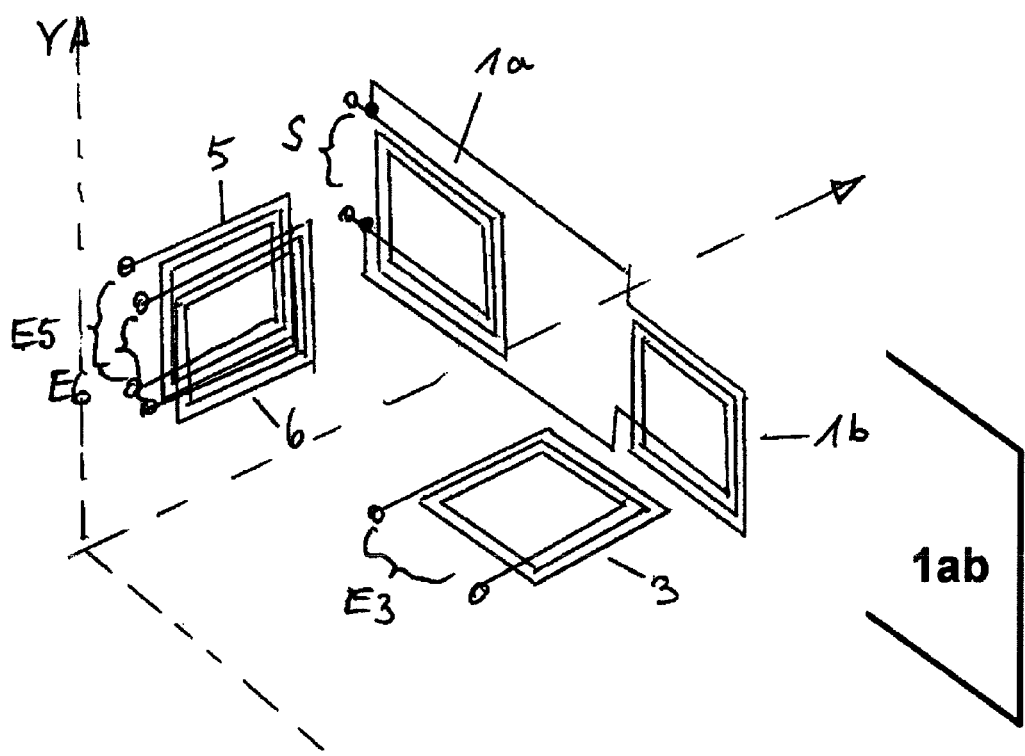

FIG. 6 shows another practical example of the invention expanded to three measurement axes.

In order to require the least number of transmitting coils there is the possibility of arranging two receiving coils (5) and (6) very close to each other. This can be done either for the x direction or the z direction. If the two coils are arranged so that their common axis runs in the x direction, as shown in FIG. 6, the following applies:

From the sum of the two resulting receiver voltages (E5) and (E6), we then obtain the signal for the distance to the transmitting coil (1a) and therefore to the plane (1ab) on which the two coils (1a) and (1b) lie. The difference (E5−E6) of the two voltages gives the position relative to the center of the transmitting coil (1) in the x direction. By ratio formation ((E5−E6)/(E5+E6)) measurement of the position in the x direction is therefore again independent of the distance of the two coils relative to plane (1ab). At the same time, the distance-independent measurement for the position in the z direction can be similarly determined by means of the ratio (E3/(E5+E6)). All these arrangements require connection of the transmitting coils to an AC source via a cable.

Figure 7:
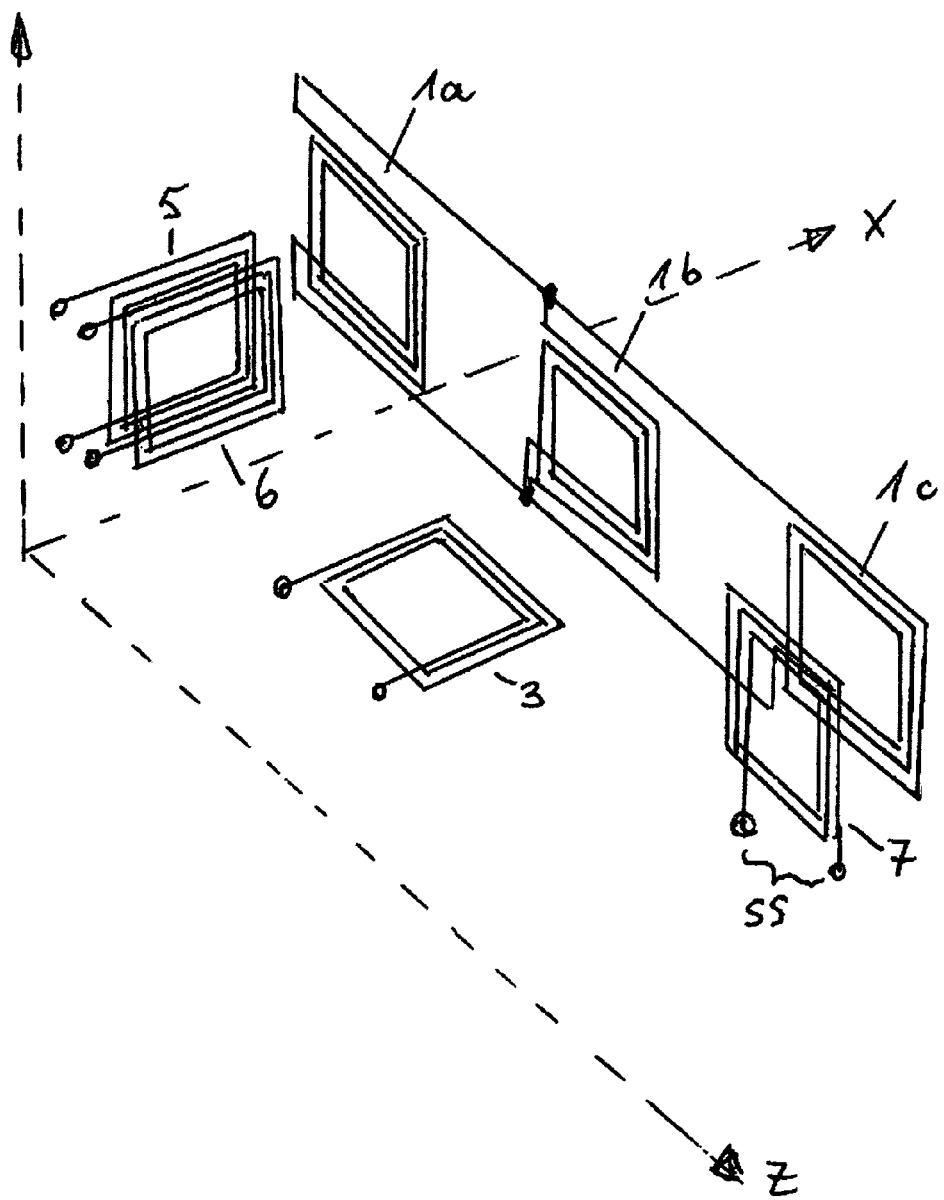

FIG. 7 shows another practical example of the invention, namely another possibility that makes cable connection unnecessary. An additional coil (1c) is arranged on the same plane as the transmitting coils, which serves as receiving coil for power transmission. A transmitting coil (7), which is mechanically connected to the receiving coils (3), (5) and (6), lies opposite coil (1c). By supplying a constant AC voltage (SS) a constant electromagnetic field is emitted by this transmitting coil. The voltage then induced in coil (1c) is sent to the two transmitting coils (1a) and (1b) by direct electrical connection.

Figure 8:
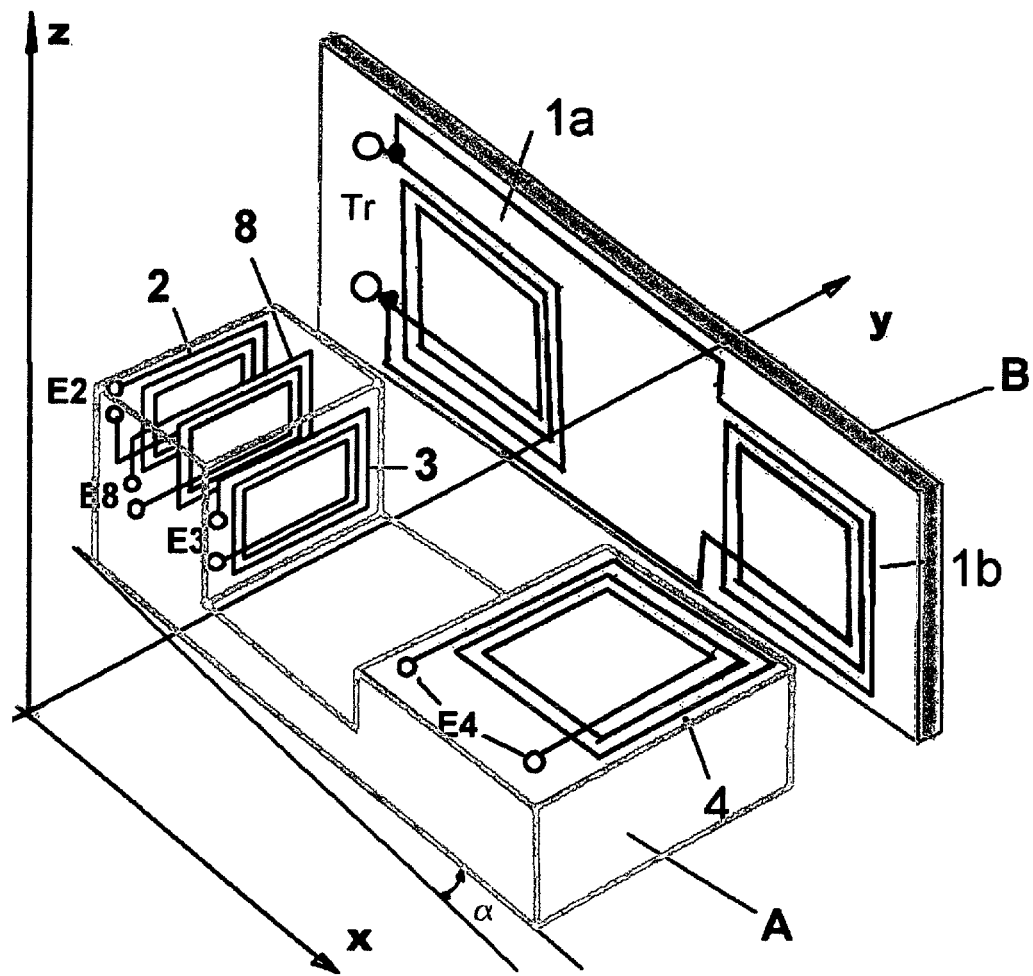

According to the depiction in FIG. 8 in the context of an additional practical example of the invention, angle-dependent measurement errors (angle a), which occur, for example, during the assembly of the two sensor units A (receiving coils) and B (transmitting coils) can be compensated. For this purpose there is the possibility of positioning an additional receiving coil 8 in the center between the two receiving coils 2 and 3. The sum of the received voltages E2 and E3 again gives the measured distance in the y direction in order to permit, for example, during assembly, precise alignment of the two sensor units A and B relative to each other, and the receiver voltages E8 and the difference voltage (E2−E3), which are also dependent on angle a, can be measured simultaneously and set at zero by mechanical adjustment. Extremely precise calibration is therefore possible.

The difference voltage (E2−E3), which is produced by any present angle error, also remains constant during displacement of the two sensor units A and B in the x direction. Consequently, instead of eliminating the error by mechanical alignment, the error can be eliminated by calculation, in which case the angle error k, which is produced in the difference voltage (E2−E3) as a function of angle a and simultaneously occurs in the receiver voltage E8 in the same ratio, is multiplied by the matching factor m and subtracted from signal E8.

The displacement in the x direction in this case is measured by means of the voltage ratio (E8−k×m)/(E2+E3).

In order to optimize the sensitivity of all these arrangements it is advantageous by parallel connection of capacitors to complete the coils to oscillator circuits, whose resonance is tuned to the employed frequency. This reduces the required feed current on the transmission side in the transmitting coils and provides large receiver voltages on the receiver side, which are only slightly less or even greater than the transmitted voltages (when the inductance of the receiving coil is greater than that of the transmitting coil) with the close spacing relative to the transmitting coils. A very good signal-noise ratio is thus obtained.

These arrangements naturally represent only examples. In principle, other arrangements of this type are conceivable.

The invention claimed is:

1. A position sensor comprising at least two coils, the first coil being supplied with a specific frequency so that it emits a constant electromagnetic field and this field being received or detected by means of a second coil, wherein the axis of the second coil is angled relative to the axis of the first coil, and the first coil is positioned on a first object and the second coil is positioned on a second object, wherein the relative position between said first and second objects is to be measured;

the position sensor further comprising a third coil that emits a constant electromagnetic field and a fourth coil and a fifth coil that receive or detect the constant electromagnetic field of the third coil, the first coil being mechanically connected to the third coil, and the axis of the third coil lying in the same direction as that of the first coil, the first coil and the third coil lying next to each other, the second coil lying next to the fourth coil and the fifth coil, and the fourth coil and the fifth coil are arranged very close next to each other with a common axis and that their common axis runs in the same direction, wherein said common axis is orthogonal to the axis of the second coil.

2. The position sensor according to claim 1, wherein the axis of the second coil is at angle of 90° relative to the axis of the first coil.

3. The position sensor according to claim 1, wherein the first coil is designed as a rectangular coil.

4. The position sensor according to claim 1 wherein the second coil is designed as a rectangular coil.

5. The position sensor according to claim 1, wherein the position sensor further comprising a sixth coil for receiving or detecting the electromagnetic field of the third coil, and the fourth coil, the fifth coil and the sixth coil are arranged very close next to each other, namely either next to each other in the x direction or next to each other in the z direction and that their common axis runs in the same direction.

6. The position sensor according to claim 5, wherein the first coil, the second coil, the third coil to the sixth coil are completed to oscillator circuits.

7. The position sensor according to claim 5, wherein the first coil, the second coil, the third to the sixth coil are formed on or within ceramic multilayers.

8. The position sensor according to claim 1, wherein an additional coil is arranged on the same plane as the first coil and the third coil, which serves as receiving coil for power transmission.

9. The position sensor according to claim 8, wherein a transmitting coil is arranged relative to the additional coil, which is preferably mechanically firmly connected to the second coil, the fourth coil and the fifth coil, in which a constant electromagnetic field is emitted via the transmitting coil by supplying a preferably constant AC voltage and in which the voltage included in the additional coil is sent to the first coil and the third coil by direct electrical connection.

10. The position sensor according to claim 9, wherein the field directions of the first coil and the third coil are arranged so that they mutually eliminate errors at large distance.

* * * * *